(12) United States Patent
Clancy, III et al.

(10) Patent No.: US 9,544,778 B2
(45) Date of Patent: Jan. 10, 2017

(54) SYSTEM AND METHOD FOR NETWORK SHARING BETWEEN PUBLIC SAFETY USERS AND COMMERCIAL USERS

(71) Applicant: Federated Wireless, Inc., Boston, MA (US)

(72) Inventors: Thomas Charles Clancy, III, Washington, DC (US); Ashwin Amanna, Leesburg, VA (US)

(73) Assignee: FEDERATED WIRELESS, INC., Boston, MA (US)

( * ) Notice: Subject to any disclaimer, the term of this patent is extended or adjusted under 35 U.S.C. 154(b) by 336 days.

(21) Appl. No.: 14/206,504

(22) Filed: Mar. 12, 2014

(65) Prior Publication Data
US 2014/0280973 A1    Sep. 18, 2014

Related U.S. Application Data

(60) Provisional application No. 61/785,906, filed on Mar. 14, 2013.

(51) Int. Cl.
| | |
|---|---|
| *H04W 16/14* | (2009.01) |
| *H04W 72/08* | (2009.01) |
| *H04L 5/00* | (2006.01) |
| *H04L 12/815* | (2013.01) |
| *H04W 72/10* | (2009.01) |

(52) U.S. Cl.
CPC ............ *H04W 16/14* (2013.01); *H04L 5/0037* (2013.01); *H04W 72/08* (2013.01); *H04L 47/22* (2013.01); *H04W 72/10* (2013.01)

(58) Field of Classification Search
CPC .. H04W 72/1205; H04W 16/14; H04W 72/10; H04W 72/08
See application file for complete search history.

(56) References Cited

U.S. PATENT DOCUMENTS

| | | | | |
|---|---|---|---|---|
| 5,917,822 A | * | 6/1999 | Lyles | H04L 12/2801 370/395.4 |
| 8,126,510 B1 | * | 2/2012 | Samson | H04B 10/25753 370/315 |
| 8,369,220 B1 | * | 2/2013 | Khanna | H04L 41/5022 370/235 |

(Continued)

OTHER PUBLICATIONS

Wang, Qi, and Timothy X. Brown. "Public safety and commercial spectrum sharing via network pricing and admission control." Selected Areas in Communications, IEEE Journal on 25.3 (2007): 622-632.*

(Continued)

*Primary Examiner* — Jimmy H Tran
(74) *Attorney, Agent, or Firm* — Finnegan, Henderson, Farabow, Garrett & Dunner, LLP

(57) ABSTRACT

Described herein are systems and methods for sharing public safety network resources between public safety devices and commercial devices. A request for network resources is received from a commercial device for an application running on the commercial device. It is determined that the request is for a first type of traffic that is tolerant to time delays caused by resource fluctuations. Resources are allocated from a public safety network instead of resources from a commercial network, so that the commercial device can use resources from the public safety network.

18 Claims, 8 Drawing Sheets

(56) References Cited

U.S. PATENT DOCUMENTS

| | | | | |
|---|---|---|---|---|
| 8,929,217 | B2* | 1/2015 | Torres | H04L 41/5022 370/229 |
| 9,161,231 | B2* | 10/2015 | Buddhikot | H04W 16/14 |
| 2008/0181145 | A1* | 7/2008 | Chowdhury | H04W 4/08 370/310 |
| 2009/0010186 | A1* | 1/2009 | Li | H04W 52/243 370/310 |
| 2009/0034508 | A1* | 2/2009 | Gurney | H04W 16/14 370/351 |
| 2009/0103488 | A1* | 4/2009 | Zhu | H04W 52/26 370/330 |
| 2009/0116438 | A1* | 5/2009 | Madan | H04L 12/5695 370/329 |
| 2009/0247204 | A1* | 10/2009 | Sennett | H04W 16/14 455/512 |
| 2009/0247205 | A1* | 10/2009 | Sennett | H04W 72/10 455/512 |
| 2009/0312045 | A1* | 12/2009 | Miller | H04W 4/08 455/519 |
| 2011/0019652 | A1* | 1/2011 | Atwal | H04W 74/002 370/338 |
| 2011/0158184 | A1* | 6/2011 | Agulnik | H04W 28/18 370/329 |
| 2011/0237287 | A1* | 9/2011 | Klein | H04M 3/42178 455/521 |
| 2011/0305137 | A1* | 12/2011 | Chu | H04L 47/245 370/230 |
| 2012/0014332 | A1* | 1/2012 | Smith | H04W 16/14 370/329 |
| 2012/0028626 | A1* | 2/2012 | Marocchi | H04L 63/104 455/422.1 |
| 2012/0157144 | A1* | 6/2012 | Stanforth | H04W 16/14 455/512 |
| 2013/0132549 | A1* | 5/2013 | Rodriguez | H04L 45/00 709/223 |
| 2013/0183995 | A1* | 7/2013 | Smith | H04W 72/08 455/452.2 |
| 2013/0201833 | A1* | 8/2013 | Masputra | H04L 47/60 370/236 |
| 2013/0201922 | A1* | 8/2013 | Fredericks | H04W 76/066 370/329 |
| 2013/0203435 | A1* | 8/2013 | Smith | H04W 16/14 455/454 |
| 2014/0064077 | A1* | 3/2014 | Chorafakis | H04L 47/22 370/230.1 |
| 2014/0162585 | A1* | 6/2014 | Bose | H04W 16/14 455/404.1 |
| 2014/0269526 | A1* | 9/2014 | Mitola, III | H04W 72/12 370/329 |
| 2014/0280937 | A1* | 9/2014 | Miller | H04W 4/22 709/225 |
| 2014/0329517 | A1* | 11/2014 | Van Phan | H04W 76/023 455/418 |
| 2015/0172896 | A1* | 6/2015 | Van Phan | H04W 4/22 455/404.1 |

OTHER PUBLICATIONS

Ferrus, Ramon, et al. "Public safety communications: Enhancement through cognitive radio and spectrum sharing principles." Vehicular Technology Magazine, IEEE 7.2 (2012): 54-61.*

Wang, Zheng, and Anindya Basu. "Resource allocation for elastic traffic: Architecture and mechanisms." Network Operations and Management Symposium, 2000. NOMS 2000. 2000 IEEE/IFIP. IEEE, 2000.*

Peha, Jon M. "Sharing spectrum through spectrum policy reform and cognitive radio." Proceedings of the IEEE 97.4 (2009): 708-719.*

Lehr, William, and Jon Crowcroft. "Managing shared access to a spectrum commons." First IEEE International Symposium on New Frontiers in Dynamic Spectrum Access Networks, 2005. DySPAN 2005.. IEEE, 2005.*

Huang, Jianwei, Randall A. Berry, and Michael L. Honig. "Spectrum sharing with distributed interference compensation." First IEEE International Symposium on New Frontiers in Dynamic Spectrum Access Networks, 2005. DySPAN 2005.. IEEE, 2005.*

* cited by examiner

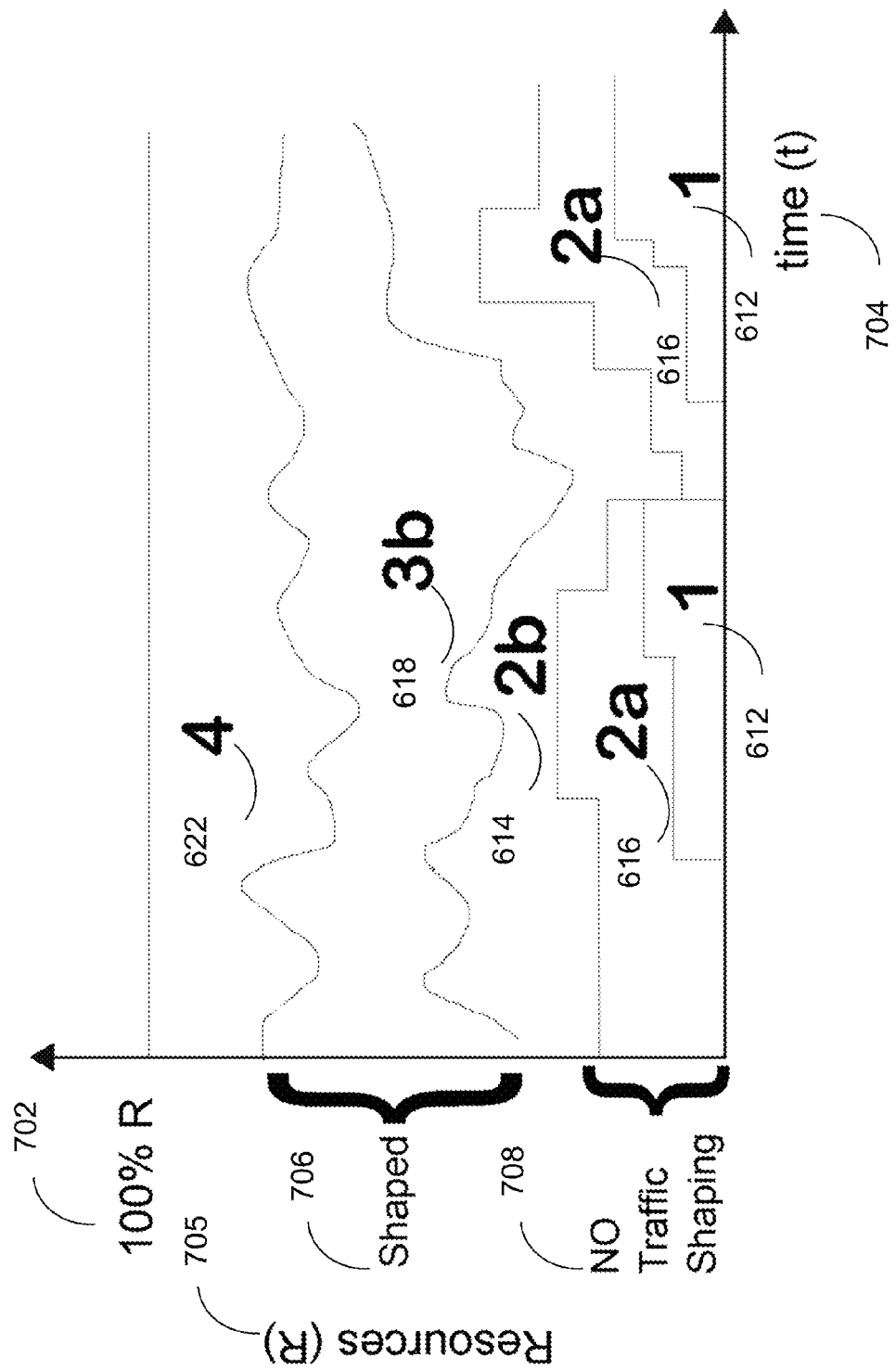

SYSTEM AND METHOD FOR NETWORK SHARING BETWEEN PUBLIC SAFETY USERS AND COMMERCIAL USERS

RELATED APPLICATION

This application relates to and claims priority under 35 U.S.C. §119(e) to U.S. Provisional Patent Application No. 61/785,906, entitled System and Method for Network Sharing Between Public Safety Users and Commercial Users, filed on Mar. 14, 2013, the disclosure of which is hereby incorporated by reference herein in its entirety.

FIELD

This disclosure relates to a system and method for network sharing between users.

BACKGROUND

The proliferation of smartphones has completely changed the traffic characteristics of cellular networks. With multiple applications (apps) on each device often simultaneously downloading email, music, videos, web content, etc., the data load on commercial cellular operators is heavy and can adversely affect both operators and users. Advances in fourth generation (4G) cellular technologies, such as Long Term Evolution (LTE), have increased overall network capacity, but network resources remain finite and infrastructure costs are high. There has also been a need for a dedicated public safety communications network using advanced mobile broadband communications technology, and enabling that network to seamlessly share resources with commercial mobile broadband infrastructure.

Therefore a need exists for enabling sharing of network resources.

SUMMARY OF THE INVENTION

Described herein are systems and methods for sharing of network resources between commercial users and public safety users wherein commercial users have access to not only their own dedicated commercial network, but also a separate public safety network, with priority of data traffic on the public safety network provided to public safety users. Commercial networks often include networks that are owned and operated by for-profit entities, providing services to end users over entity owned infrastructure. Commercial networks typically have licensed access to spectral resources, and own or control some if not all of their network infrastructure. For example, common commercial networks include those owned and operated by Tier 1 Carriers, such as Verizon, AT&T, or T-Mobile. A public safety network might enable citizens to contact first responders at all times and without delay. The nationwide 9-1-1 network is an example of a public safety network. Another example is an emergency alert network that ensures that people can receive critical information concerning emergencies. A public safety network may be a network that allows first responders to communicate with one another at all times and without delay. A trait of most public safety networks is that some users or some types of communications or services have priority over other users or other types of communications or services. Public safety networks come into use when there is a crises or an emergency, and at other times the networks may be largely unused. This allows public safely networks to sell excess capacity for commercial purposes and reduce the cost of service to the public safety community.

Data traffic can be characterized such that commercial traffic that is tolerant of resource fluctuations, commonly referred to as elastic traffic, can share the public safety network, while inelastic traffic, such as digital voice data, would stay on the user's commercial network. Thus a network sharing approach can allow both commercial use of the public safety network while simultaneously providing the public safety users with the dynamic prioritization required for various situations.

Specifically, user traffic can be categorized by each running application, and the allocation of network spectrum resources can be accomplished by an iterative bidding process between users and a network, allowing commercial users access to the public safety network for some types of application data traffic. The addition of a priority engine allows changes to the allocation according to various conditions such that public safety users gain access to network resources at a higher priority than commercial users and according to type of data traffic. In other words, a priority-weighting scheme can be defined by the public safety operator, which applies different priorities to specific users and specific types of traffic. For example, mission-critical voice communications can have priority over all other users in the event of a major emergency. During a minor incident, such as a mild snowstorm, enterprise public safety users, such as snowplow operators, can have priority over commercial users for voice communications. Voice communications can have priority over other data. Thus dynamic prioritization provides public safety users the ability to reduce commercial use in a scaled manner to accommodate emergency and mission critical events. During normal non-emergency operations, there may be significant spectrum resources that might otherwise go unused without this network sharing approach, and these spectrum resources can be shared with commercial users offloading elastic traffic, such as video streaming, onto the available bandwidth. User traffic can then be managed using traffic shaping techniques, both at a network and a device level.

The disclosed subject matter includes a computerized method for sharing public safety network resources between public safety devices and commercial devices. A computing device in a commercial network receives a request for network resources from a commercial device for an application running on the commercial device. The computing device determines that the request is for a first type of traffic that is tolerant to time delays caused by resource fluctuations. The computing device allocates resources from a public safety network instead of resources from a commercial network, so that the commercial device can use resources from the public safety network.

The disclosed subject matter further includes a computerized system for sharing public safety network resources between public safety devices and commercial devices. The computerized system includes a processor configured to run a module stored in memory that is configured to cause the processor to receive a request for network resources from a commercial device for an application running on the commercial device. The module stored in memory is further configured to cause the processor to determine that the request is for a first type of traffic that is tolerant to time delays caused by resource fluctuations. The module stored in memory is further configured to cause the processor to allocate resources from a public safety network instead of resources from a commercial network, so that the commercial device can use resources from the public safety network.

The disclosed subject matter further includes a non-transitory computer readable medium having executable instructions operable to cause an apparatus to receive a request for network resources from a commercial device for an application running on the commercial device. The instructions are operable to cause the apparatus to determine that the request is for a first type of traffic that is tolerant to time delays caused by resource fluctuations. The instructions are operable to cause the apparatus to allocate resources from a public safety network instead of resources from a commercial network, so that the commercial device can use resources from the public safety network.

The systems and methods described herein can intelligently distribute the data traffic between networks. This approach characterizes types of data traffic in order to implement network sharing and customized shaping and enforcement policies. Aggregate utility functions define device-level application needs and lend themselves to a bidding process for overall resource allocation between devices. Also, as further described below, traffic shaping can be achieved in an intelligent, iterative process whereby data is throttled in a controlled manner, with user experience and utility as critical constraints. A related technique of traffic policing allows noncompliant data packets (whose loss would likely be unknown to the user) to be dropped.

These and other capabilities of the disclosed subject matter will be more fully understood after a review of the following figures and detailed description. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 7 is an illustration of how traffic created by the classifications illustrated in FIG. 6 may be controlled over time and the available spectrum resources, and illustrates how some data traffic will be shaped and some will not be shaped.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

As an overview, the systems and methods described herein present an approach to network sharing of a public safety network between commercial users and public safety users. The active applications running on a commercial device are categorized, and elastic applications (wherein time delays in data do not matter so much to a user) can be allocated resources via the public safety network, while inelastic applications can be allocated resources via the commercial network. A priority engine of the public safety network ensures that public safety users or specific types of data (such as voice communications) take priority when network resources are limited. Data traffic flows both ways between devices and typical network services. In general, each mobile device's data traffic can be managed by running it through a corresponding network traffic manager, and each application's data traffic can be managed by running it through a corresponding application level traffic shaper that can time delay the flow of data.

Figure 1A:
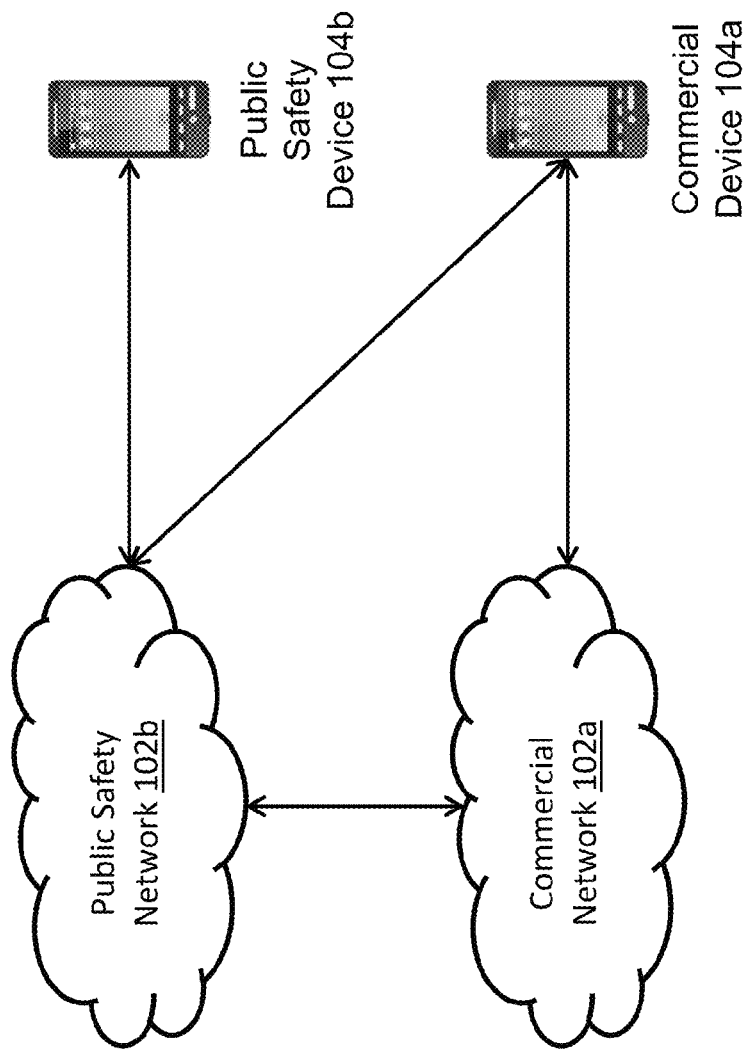
FIG. 1A is a block diagram of an exemplary system for network sharing.

With reference to FIG. 1A, a system 100 for network sharing includes a commercial network 102a interacting with end-user commercial devices 104a, and a public safety network 102b interacting with both end-user commercial devices 104a and public safety devices 104b. Each mobile device 104a, 104b includes a respective plurality of applications 110a, 110b.

Figure 1B:
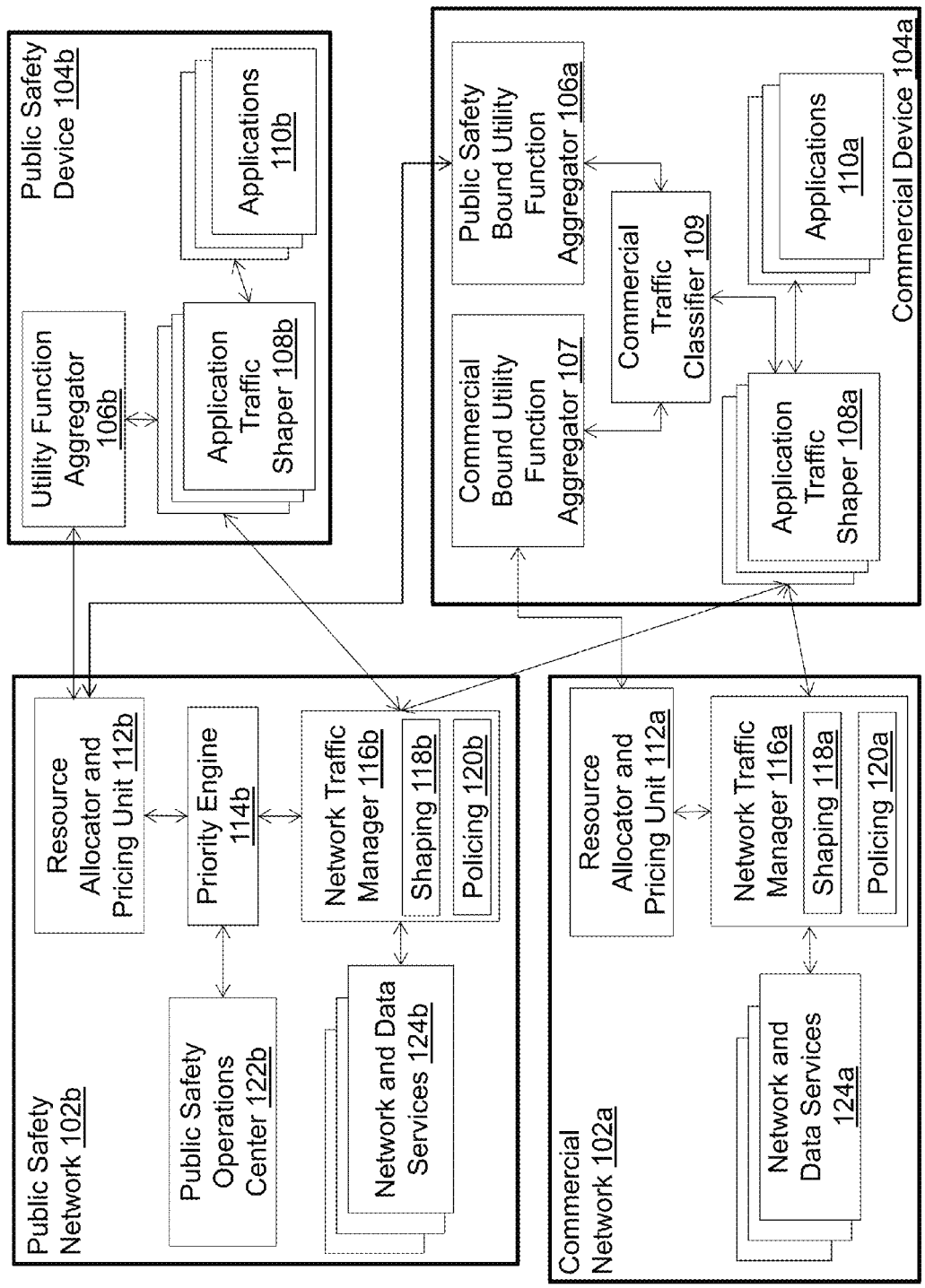
FIG. 1B is a block diagram of an exemplary system for network sharing.

As shown in more detail in FIG. 1B, the commercial network 102a includes network and data services 124a, a resource allocator and pricing unit 112a, and a network traffic manager 116a, which performs traffic shaping by shaper 118a and traffic policing by unit 120a.

Similarly, the public safety network 102b includes network and data services 124b, a resource allocator and pricing unit 112b, and a network traffic manager 116b, which performs traffic shaping by shaper 118b and performs traffic policing by unit 120b. Network 102b also includes a public safety operations center 122b and a priority engine 114b, which implements priorities of network use by modifying the resource allocations from the resource allocator and pricing unit 112b, as described below.

More specifically, FIG. 1 depicts commercial network 102a in communication with a single commercial mobile device 104a that includes a plurality of applications 110a, a plurality of corresponding application traffic shapers 108a, a commercial traffic classifier 109 for classifying applications as elastic or inelastic, a commercial network bound utility function aggregator 107, and a public safety network bound utility function aggregator 106a.

Public safety network 102b is in communication with both device 104a, and device 104b. Device 104b includes a plurality of applications 110b, a plurality of application traffic shapers 108b, and a utility function aggregator 106b.

Applications 110a or 110b, such as weather, news, or streaming media, are running on the respective device 104a or 104b either in the foreground or background. Traffic shapers 108a or 108b apply traffic shaping on respective data flows coming from and going to each corresponding unique active application. Traffic shaping refers to smoothing out traffic bursts in order to minimize peaks created by traffic bursts coming from multiple applications at the same time. The traffic shaping used here in general includes a filtering process wherein each application's data flow is smoothed and includes two specific configuration parameters that are customized based on the type of application and the elastic properties of the application.

Elasticity refers to the application's tolerance for operating under limited bandwidth resources. For example, a voice application is considered inelastic because below a certain threshold, the performance of the voice service has no value. Conversely, once above this threshold, there is little performance gain from operating at a significantly higher bandwidth than the threshold. In contrast, a video streaming application's traffic possesses some elasticity because the user experience can remain good across a wider range of bandwidth resources.

The commercial traffic classifier 109 operates to classify applications as being elastic or inelastic, such as based on a list of different applications, or based on historical use patterns or simply preferences of a user. These elastic and inelastic properties of specific applications determine whether resources for a commercial device 104a will be allocated or requested from the commercial network or from the public safety network. Further, these properties can determine the traffic shaping configuration parameters, and also a utility function for each application. A utility function represents a quantification of 'goodness' of a specific application based upon the bandwidth provided to the application.

Each application's performance can be quantified in the form of a corresponding utility function, which is a measure of utility (benefit, goodness, value, or the like) and which may translate a given performance metric, such as bandwidth, onto a normalized scale, such as a scale between [0,1]. For example, a video application requires a certain amount of throughput to provide an acceptable viewing experience. In contrast, background advertising can operate on much less throughput without the user noticing degradation. Therefore, the specific shape of the utility functions for these two applications would be different. At the same low level of throughput, the utility for the background application would be much higher than the throughput utility of the video application, because the advertising application delivers its intended value, while the video application does not. At high throughput, the utility of the video application might exceed that of the advertising application, because the absolute value of the video application (when working well) might excel that of the advertising application. Utility functions can take various forms (normalized sigmoid, logarithmic, threshold functions, step functions, delta functions, sloped curves, etc.) and can be defined for a variety of different performance metrics, such as throughput, packet error rate, latency/lag, etc.

The utility functions for the applications may be adjusted through normalization procedures in order to compare them on a common scale. Because of this, they can then be combined to form a single overall or aggregate utility function. Utility function aggregator 106b aggregates all active application running on given device 104b. Commercial bound utility function aggregator 107 aggregates all inelastic applications running on given device 104a, and public safety network bound aggregator 106a aggregates elastic applications running on given device 104a. Aggregation of multiple device utility functions can be a weighted sum, or weighted product. The selection of weights for applications can be dependent on the goals of the specific user at a specific time. For example, email may be of more importance to a user than background updates from a news feed source, and therefore the email application will be weighted more heavily during the utility function aggregation process.

All devices require spectrum and bandwidth resources in order to feed their respective running applications. Each aggregator may generate a bid for resources based on the aggregate utility function, which may then be communicated to a corresponding network 102a or 102b and to a corresponding resource allocator and pricing unit 112a or 112b, which operate an iterative process that aggregates bids received from multiple user devices and identifies a price for resources that balances the user needs and fairness amongst users to allocate resources amongst users. This price is known as a 'shadow price' because it may not tie to actual dollars. The shadow pricing procedure is described with respect to FIG. 5.

The resource assignment is further enhanced by the incorporation of priority weighting or priority level based on the type of user, wherein public safety users are provided higher priority than commercial users. For example, public safety first responders can be granted higher priority than public safety enterprise users (e.g. snowplow operators), who can be granted higher priority than commercial users. In addition, the type of traffic can further define the priority weighting. For example a first responder voice call will have a higher priority than downloading a map to a snowplow operator. Priority engine 114b implements the priorities by modifying the resource allocations from the resource allocator 112b. Public safety operations center 122 defines these priorities such that the priorities are dynamic and flexible according to various different situations.

During normal operations there will be limited public safety traffic, which frees up more resources for secondary use of the public safety network by commercial users. As mentioned, it is envisioned that commercial use of the public safety network would be limited to traffic types that are elastic and can tolerate fluctuations in available resources. For example, commercial voice traffic would not go across the shared public safety network and would remain on the dedicated commercial network.

Based on the results of the resource pricing process and the application of defined priorities, for commercial network 102b, network traffic manager 116b then defines traffic shaping and traffic policing policies for each unique device. This traffic shaping is a network level process applied to a specific device and can be viewed as a cascaded traffic shaping process that is performed on top of the application specific traffic shaping by shaper 108a or 108b, which is performed at the device level on each specific application. In this process, traffic policing differs from traffic shaping such that policed data packets will be dropped completely from use in contrast with traffic shaping which holds data packets for a period of time, but eventually sends them. Both the network level traffic shaping and traffic policing take into account the current priorities. After traffic shaping and policing are applied at the device level, the data traffic moves between the device and the intended network and data services.

A similar process occurs for the elastic traffic on the commercial network, except that no priority engine exists to modify allocated resources.

Figure 2:
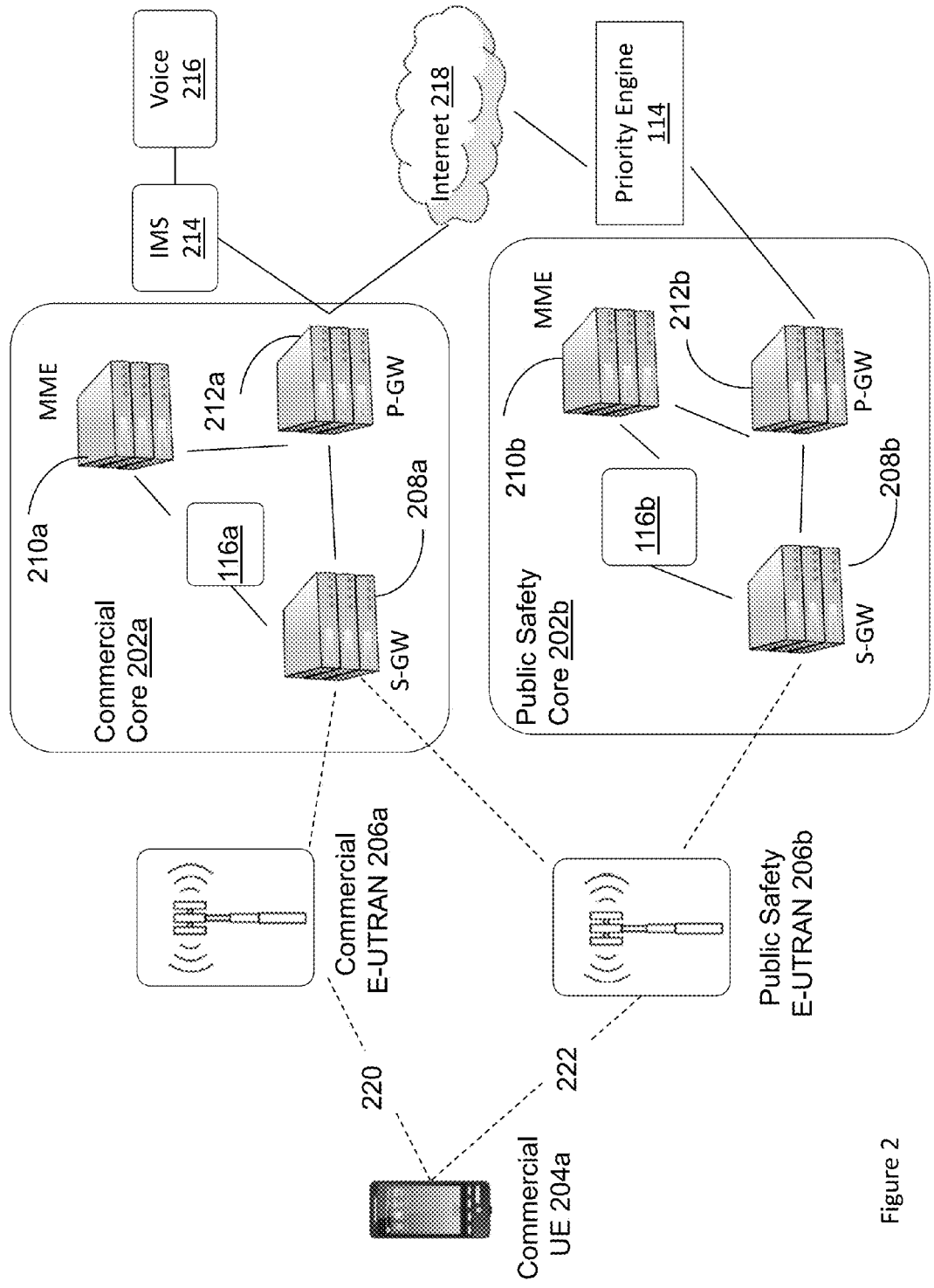
FIG. 2 is an illustration of exemplary system architecture of a commercial user device and associated networks, such as in an LTE (long term evolution) network, illustrating the enhancement of an end user having two potential connections: one to a commercial LTE network, and one to a public safety LTE network.
Figure 3:
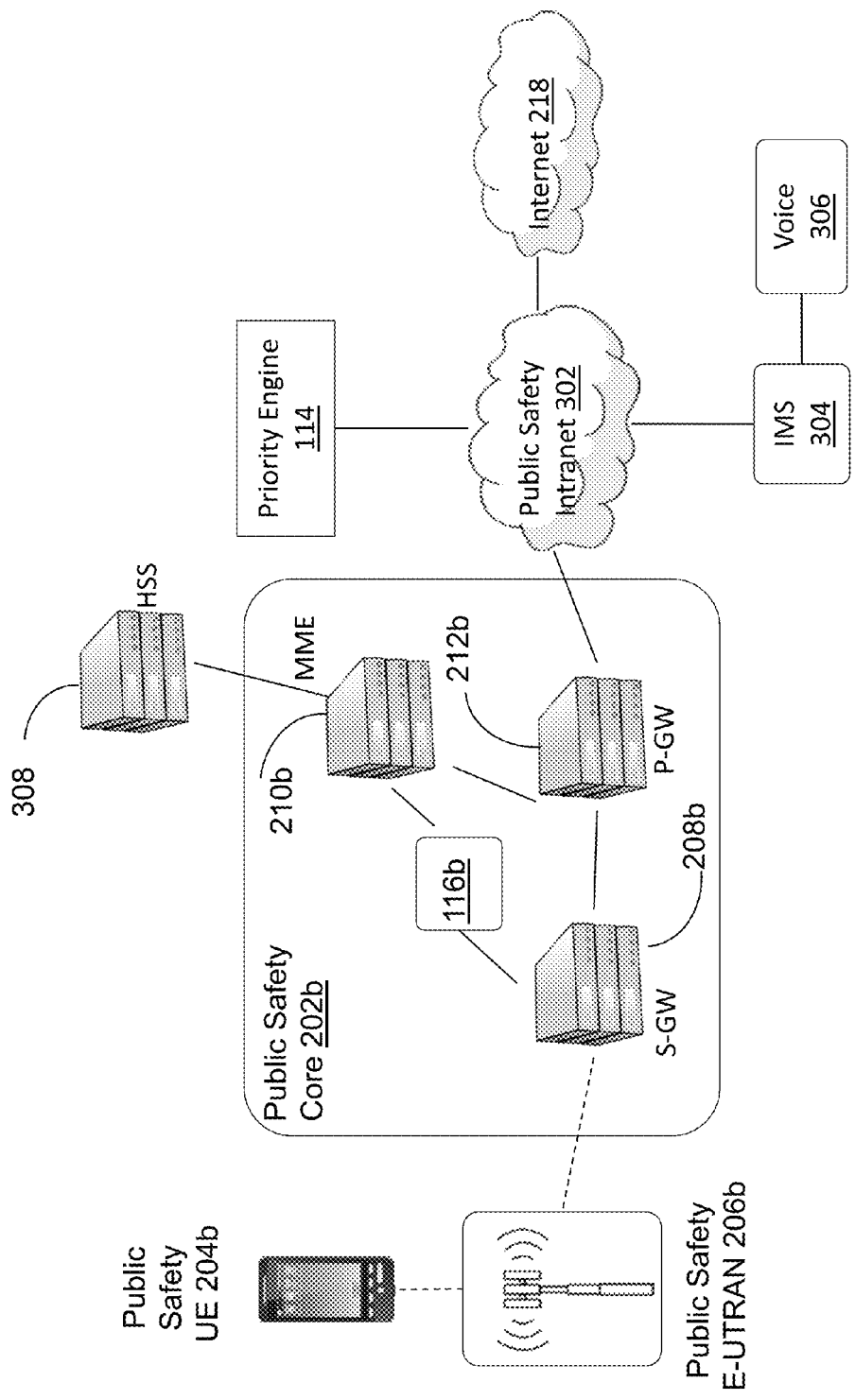
FIG. 3 is an illustration of exemplary system architecture for a public safety user device and LTE network, with enhancements including the addition of a secure public safety intranet as an intermediate portal before allowing access to the internet; and a priority engine that provides overall management of user priority which will drive the amount of resources each user is given.

FIGS. 2 and 3 illustrate exemplary network architectures to implement a network sharing process. In particular, FIG. 2 illustrates how commercial user equipment (UE) 204a connects with both a commercial network and a public safety communications network (where 'a' denotes commercial entity related components and 'b' denotes public safety entity related components). This assumes that the UE 204a has two air interfaces capable of operating on the two different spectrum bands of the networks. The commercial network 102a can transmit responses (e.g., responses to resource request messages) to configure the commercial device 204a to send data for particular applications over corresponding air interfaces. The commercial device 204a can send inelastic, and delay sensitive traffic via interface 220, across the existing commercial network consisting of a commercial base station 206a, shown here using a long term evolution (LTE) EUTRAN, and commercial core network 202a. Within the commercial core network, a serving gateway 208a (S-GW) interfaces with a packet gateway 212a (P-GW) before forwarding data on to either the Internet 218 or internet protocol (IP) multimedia subsystem (IMS) 214 which acts as an intermediary for voice over IP services 216. Within the commercial core 202a, a network level traffic shaping unit 116a interfaces between the S-GW and the mobility management entity 210a (MME).

Continuing to refer to FIG. 2, elastic traffic that is capable of tolerating delay can be forwarded via interface 222 to the public safety network consisting of a public safety base station 206b and public safety core 202b. Similar to the commercial core, the public safety core contains the same component, specifically an S-GW 208b, P-GW 212b, network level traffic shaping unit 116b and MME 210b. The public safety gateway eventually connects to the Internet 218 via priority engine 114.

In some embodiments, the commercial network or the commercial core (e.g., 102a in FIGS. 1B and 202a in FIG. 2, respectively) can configure whether a commercial device sends a particular type of traffic to the commercial network or to the public safety network. For example, referring to FIGS. 1B and 2, the S-GW 208a (in the commercial core 202a), the MME 210a (in the commercial core 202a), and/or the network traffic manager 116a (in the commercial network 102a) can be configured either alone or in some combination to allocate bandwidth from either the commercial network or the public safety network for the Commercial UE 204a in response to the type of data traffic requested from the Commercial UE 204a. This process is explained further with respect to FIG. 4, below.

FIG. 3 provides more detail on the architecture of the public safety network and how public safety user equipment 204b interacts with the network. The UE 204b connects to the public safety base station 206b with further interface with the S-GW 208b. In some embodiments, the public safety base station interfaces with a Mobility Management Entity (MME), which interfaces with the S-GW. As discussed the network level traffic manager 116b is an intermediary between the MME 210b and the S-GW 208b. A home subscriber system 308 (HSS) authenticates the public safety device to ensure that it is allowed to connect to a public safety intranet 302. The P-GW 212b interfaces with public safety intranet 302. Commercial traffic operating on this public safety network would pass through the intranet and not be authenticated to operate within the public safety intranet. The priority engine 114 is controlled by a public safety manager within the public safety intranet. Public safety voice traffic may be forwarded to an IMS 304 and onto voice connections 306.

Figure 4:
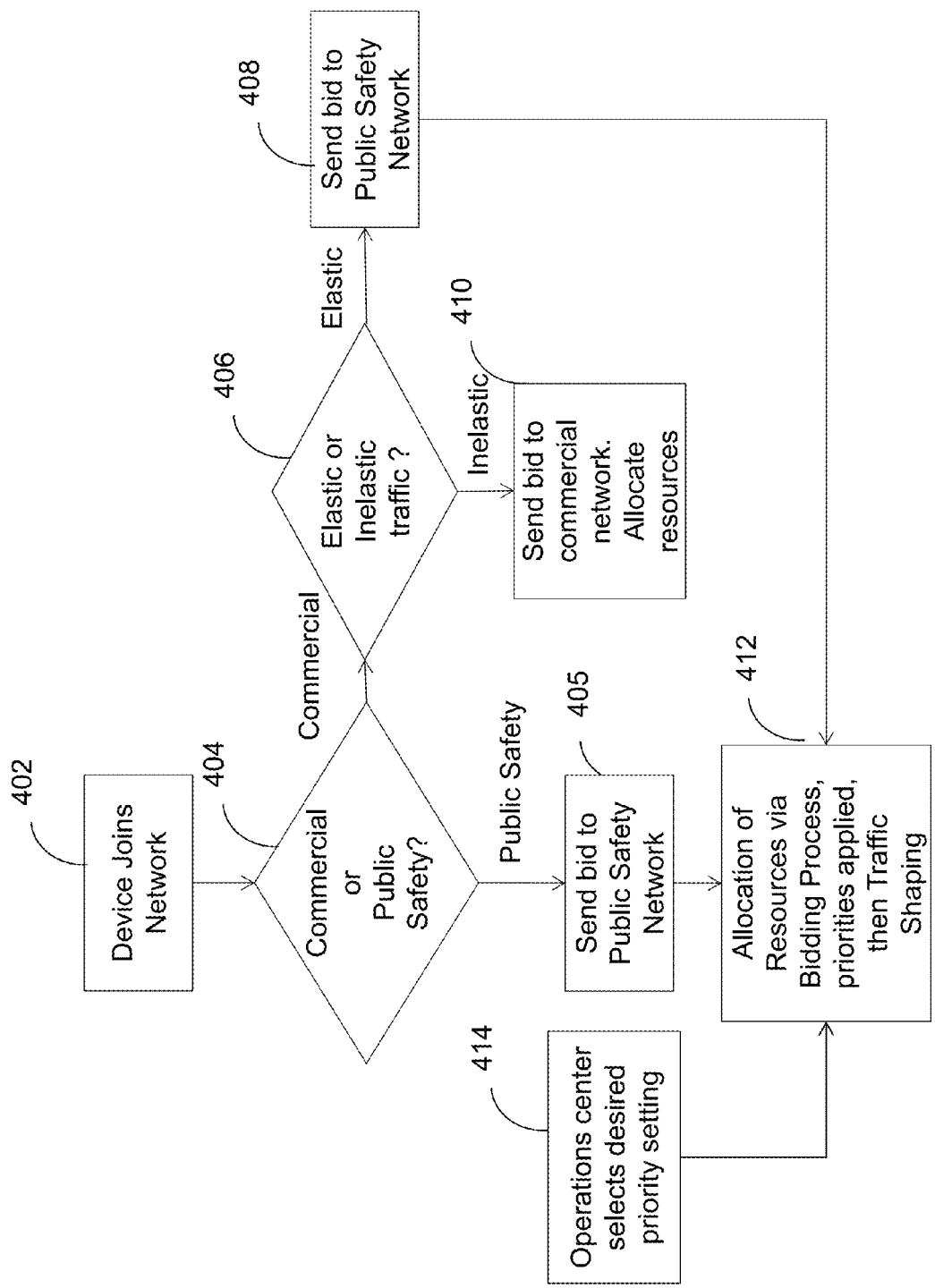
FIG. 4 is a flow diagram of exemplary operation of the system of FIG. 1.

Referring to the method in FIG. 4, an exemplary process for network sharing starts with a device joining a network at a step 402. At step 404, it is determined if the user is a commercial user or public safety user. If a public safety user, the process proceeds to a step 405, if a commercial user, processing proceeds to step 406. At step 405, utility functions are defined for applications, aggregated, and a bid based on the aggregated utility function is sent to the public safety network. From Step 405, processing proceeds to step 412.

At step 406, it is determined if the data traffic is elastic or inelastic. If elastic, then processing proceeds to a step 408. If inelastic, then processing proceeds to a step 410. In some embodiments the commercial core (e.g., the S-GW 208a or the MME 210a of the commercial core 202a shown in FIG. 2) determines whether the traffic is elastic or inelastic. For example, the request can include information (e.g., from a commercial traffic classifier, such as the commercial traffic classifier 109 in FIG. 1B) classifying a traffic request from the commercial device. The commercial core can use the classification information to determine if the data traffic is elastic or inelastic at step 406.

If the traffic is elastic, the processing proceeds to steps 408 and 412 to allocate resources from the public safety network. Advantageously, instead of using resources from the commercial network (e.g., at step 410), the commercial device can use resources from the public safety network. If the traffic is inelastic, the processing proceeds to step 410 and allocates resources from the commercial network. Advantageously, the application requesting resources is not affected by any time delays that may otherwise be created by using resources from the public safety network. For example, if the request is for voice data, since voice data is inelastic, resources are allocated from the commercial network to avoid degradation of services for the voice application running on the device.

At step 408, utility functions are defined for elastic applications, aggregated, and a bid based on the aggregated utility function is sent to the public safety network, and processing proceeds to step 412. At step 410, utility functions are defined for inelastic applications, aggregated, and a bid based on the aggregated utility function is sent to the commercial network, where resources are allocated based on a bidding process, and data traffic is managed by a traffic shaping process.

At step 412, resources are allocated by the public safety network via a bidding process, resource allocations are modified by applied priorities (set at step 414 by operations center), and then data traffic is managed by the traffic shaping process. Dynamic control of the priority settings defined in step 414 influences the ultimate traffic shaping and resource bidding.

In more detail, still referring to FIG. 4, the novel process flow described here includes the definition of dynamic priority as well as differentiation of the whether the commercial traffic is valid for use on the public safety network.

Figure 5:
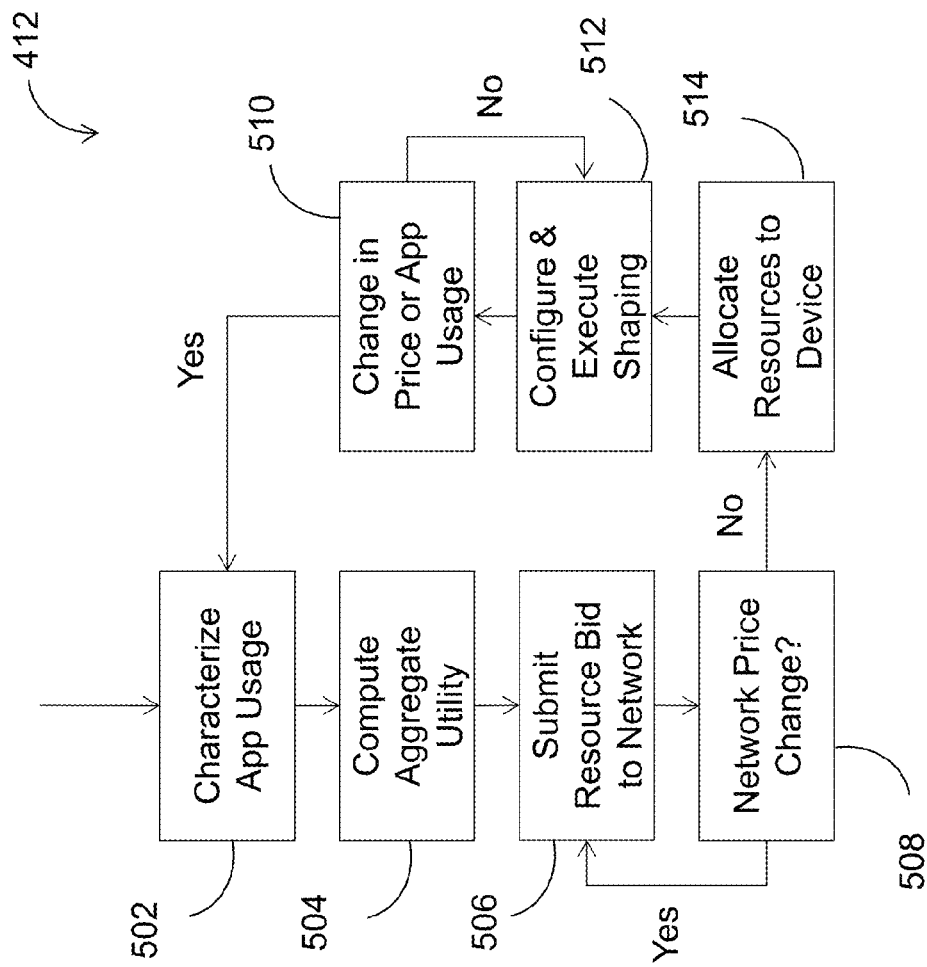
FIG. 5 is an illustration of an exemplary bidding process implemented by the system of FIG. 1.

Referring to FIG. 5, an exemplary traffic bidding process is described in more detail. At step 502, the application usage of a newly joined device is characterized via the assignment of an appropriate utility function to each running application. This step takes into account the different types of applications, such as voice, video, or data, as well as their corresponding potential tolerance to elasticity at the available bandwidth. As previously described, an elastic application is able to tolerate reduction in available bandwidth without negatively affecting the user quality of experience. In contrast, an inelastic application's performance will degrade when operated in a constrained bitrate environment, consequently degrading the user's quality of experience. Digital voice transmission is an example of an inelastic application.

As a step 504, the utility functions of all the applications on the device are aggregate into a single aggregated utility function for the device (or for elastic type applications and inelastic type applications). Based on the device's aggregate utility function, an initial bid is submitted to the network for requesting resources at step 506. An iterative process takes place such that the bid pricing converges to a final price based on the interaction of multiple users with the system and the price is conveyed to the mobile device. At 508, a determination is made whether or not there has been a change in network price compared to a previous iteration. If yes, then processing proceeds back to step 506 and a new resource bid is submitted. If no, then processing proceeds to step 514. At 514, upon convergence of a price, resources are allocated to the devices on the network and processing proceeds to a step 512. At 512, network traffic shaping is configured based on the device allocation and device traffic shaping is configured based on the available resources at each device. At 510, a determination is made whether a device has changed its application usage or whether pricing has changed because of activity of other users. If so, then processing proceeds to step 502, and the application usage is re-characterized. If not, then processing proceeds to step 512.

FIG. 5 thus illustrates an iterative process for resources bidding and further support for resource stability via invitation for rebid. Every time a new user hands off into the area or the usage profile of a phone changes significantly, there is potential that the entire network pricing for all users could change. To avoid having to redo the bidding process for all the users every time there is fluctuation, a threshold can be set. When a new user joins the network, this single user goes through the bidding process and a network price is identified. If this new price differs from the existing price by a threshold amount, such as ten percent, then the entire rebidding process for all users is reinitiated. If this new price for the user is below this predetermined threshold, then this user will retain this different price until such time that the entire network goes through the rebidding process. This helps prevent involving the entire network in every minor resource change in the network by constraining certain rebidding fluctuations to the mobile device only. This minimizes impact on the main network in reaction to each small change in usage, yet enables users to avoid being locked into a price that is not ideal for a new situation.

Figure 6:
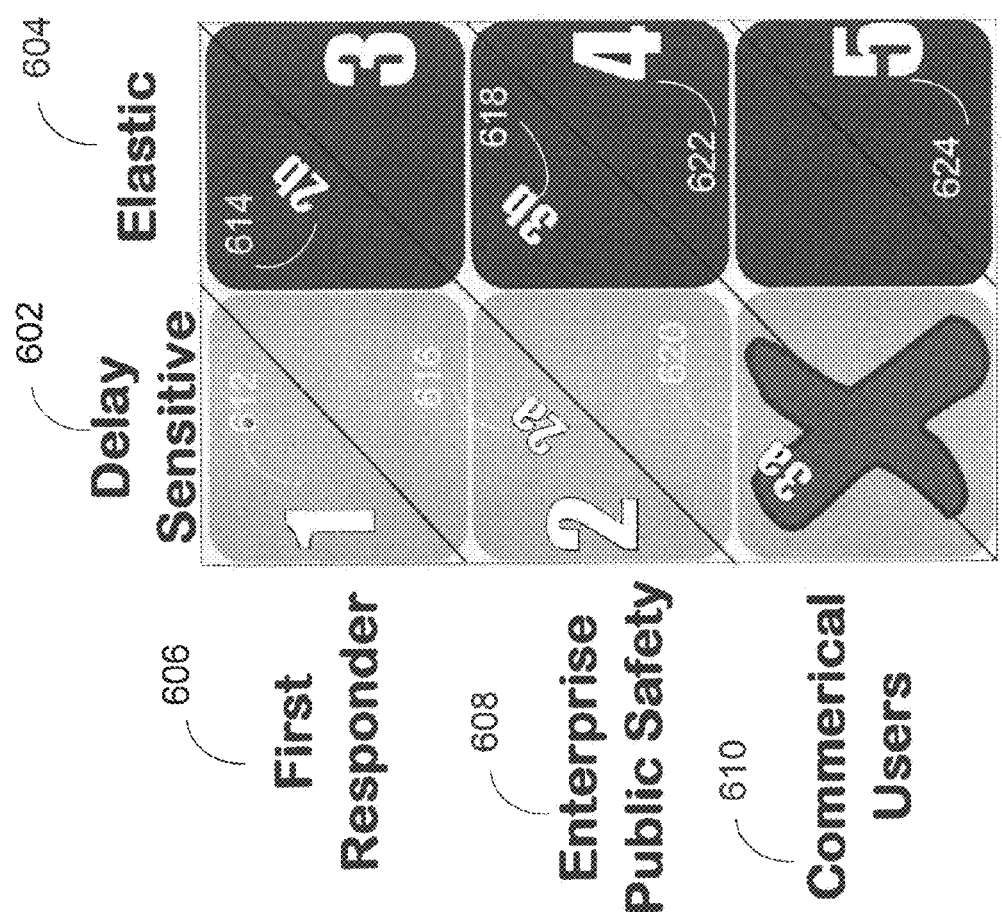
FIG. 6 is an illustration of an exemplary prioritization for different users and different types of traffic.

Referring to FIG. 6, an exemplary classification of users and types of traffic is presented which can be incorporated by the priority engine 114b. For example, traffic can be broadly classified as either delay sensitive (inelastic) traffic 602, or elastic traffic 604. Users can be broadly classified as first responders 606, such as police or fire users; enterprise public safety users 608, such as snow plow operators; and commercial users 610. Types of traffic can be further classified where level 1 represents first responder voice traffic 612. Level 2 represents public safety voice 2a 616 and first responder data 2b 614. Level 3 corresponds to commercial user voice 3a 620 and commercial user data 3b 618. Note that commercial user voice 3a 620 is not valid for use on the public safety network and hence is blocked with an X. Level 4 622 consists of lower priority enterprise public safety data and some commercial user data. Finally, level 5 624 consists of the lowest priority commercial data, such as background advertisements. Thus, the priority engine can include fine-grained differentiation between type of traffic and data user.

Referring to FIG. 7, an example of how the users and traffic described in FIG. 6 are allocated across time on axis 704 and resources on axis 705 is described. Traffic that is classified in level 1 612, and 2a 616 will not be shaped at all. Therefore, those data packets will not be delayed in time. The square nature of the traffic represents calls connecting and disconnecting. Traffic falling underneath the 2b 614, 3b 618, and 4 622 will undergo some form of traffic shaping 706. This traffic will be smoother than the non-shaped traffic. Over time, this diagram illustrates how all of the available resources 702 can be allocated to multiple types of users and classification of traffic. As the situation changes, such as in the event of a disaster, dynamic priority control will be applied which will increase the resource use of high priority traffic (level 1, 2) and decrease the use of lower priority (level 3 and 4). This can be implemented by manipulating the shaping configuration parameters.

The advantages of the present methods and systems include application of user and traffic prioritization, enhancement to network management based on the priority and traffic classification, and enabling the overall sharing of a public safety network with a commercial user.

In broad terms, the present invention is a method and system enabling the sharing of network resources between public safety and commercial user. The system enables dynamic adaptation to changes in circumstances that would warrant decreasing availability of shared resources and increasing the priority of public safety users based on mission needs.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

What is claimed is:

1. A computerized method for sharing public safety network resources between public safety devices and commercial devices, the method comprising:
receiving, by a computing device in a commercial network, a request for network resources from a commercial device for an application running on the commercial device;
determining, by the computing device, that the request is for a first type of traffic that is tolerant to time delays caused by resource fluctuations; and
in response to the determination, allocating, by the computing device, resources from a public safety network instead of resources from a commercial network, so that the commercial device can use resources from the public safety network.

2. The computerized method of claim 1, further comprising:
receiving a second request for network resources from the commercial device;
determining the second request is for a second type of traffic for a second application running on the commercial device that is not tolerant to time delays caused by resource fluctuations; and
allocating resources from the commercial network.

3. The computerized method of claim 2, comprising determining that the second request is for voice data.

4. The computerized method of claim 2, further comprising transmitting a response to the commercial device to configure the commercial device to:
use a first air interface to send data associated with the request; and
use a second air interface to send data associated with the second request, each of the first and second air interfaces configured to operate on a different network than the other air interface.

5. The computerized method of claim 1, further comprising:
receiving a request for public safety network resources for data traffic by a plurality of public safety devices; and
distributing public safety network resources between the commercial device and each of the plurality of public safety devices according to a set of priority rules that provide priority to data traffic based on the type of user and the type of data.

6. The computerized method of claim 1, wherein determining that the request is for the first type of traffic that is tolerant to time delays caused by resource fluctuations comprises receiving data from the commercial device classifying the request for the first type of traffic.

7. A computerized system for sharing public safety network resources between public safety devices and commercial devices, comprising:
a processor configured to run a module stored in memory that is configured to cause the processor to:
receive a request for network resources from a commercial device for an application running on the commercial device;
determine that the request is for a first type of traffic that is tolerant to time delays caused by resource fluctuations; and
in response to the determination, allocate resources from a public safety network instead of resources from a commercial network, so that the commercial device can use resources from the public safety network.

8. The computerized system of claim 7, wherein the module stored in memory that is further configured to cause the processor to:
receive a second request for network resources from the commercial device;
determine the second request is for a second type of traffic for a second application running on the commercial device that is not tolerant to time delays caused by resource fluctuations; and
allocate resources from the commercial network.

9. The computerized system of claim 8, wherein the module stored in memory that is further configured to cause the processor to determine that the second request is for voice data.

10. The computerized system of claim 8, wherein the module stored in memory that is further configured to cause the processor to transmit a response to the commercial device to configure the commercial device to:
use a first air interface to send data associated with the request; and
use a second air interface to send data associated with the second request, each of the first and second air interfaces configured to operate on a different network than the other air interface.

11. The computerized system of claim 7, wherein the module stored in memory that is further configured to cause the processor to:
receive a request for public safety network resources for data traffic by a plurality of public safety devices; and
distribute public safety network resources between the commercial device and each of the plurality of public safety devices according to a set of priority rules that provide priority to data traffic based on the type of user and the type of data.

12. The computerized system of claim 7, wherein determining that the request is for the first type of traffic that is tolerant to time delays caused by resource fluctuations comprises receiving data from the commercial device classifying the request for the first type of traffic.

13. A non-transitory computer readable medium having executable instructions operable to cause an apparatus to:
receive a request for network resources from a commercial device for an application running on the commercial device;
determine that the request is for a first type of traffic that is tolerant to time delays caused by resource fluctuations; and
in response to the determination, allocate resources from a public safety network instead of resources from a commercial network, so that the commercial device can use resources from the public safety network.

14. The non-transitory computer readable medium of claim 13, wherein the instructions are operable to cause an apparatus to:
receive a second request for network resources from the commercial device;
determine the second request is for a second type of traffic for a second application running on the commercial device that is not tolerant to time delays caused by resource fluctuations; and
allocate resources from the commercial network.

15. The non-transitory computer readable medium of claim 14, wherein the instructions are operable to cause an apparatus to determine that the second request is for voice data.

16. The non-transitory computer readable medium of claim 14, wherein the instructions are operable to cause an apparatus to transmit a response to the commercial device to configure the commercial device to:
use a first air interface to send data associated with the request; and
use a second air interface to send data associated with the second request, each of the first and second air interfaces configured to operate on a different network than the other air interface.

17. The non-transitory computer readable medium of claim 13, wherein the instructions are operable to cause an apparatus to:
receive a request for public safety network resources for data traffic by a plurality of public safety devices; and
distribute public safety network resources between the commercial device and each of the plurality of public safety devices according to a set of priority rules that provide priority to data traffic based on the type of user and the type of data.

18. The non-transitory computer readable medium of claim 13, wherein determining that the request is for the first type of traffic that is tolerant to time delays caused by resource fluctuations comprises receiving data from the commercial device classifying the request for the first type of traffic.

* * * * *